(12) United States Patent
Stegmann et al.

(10) Patent No.: US 11,274,712 B2
(45) Date of Patent: Mar. 15, 2022

(54) OVERLOAD CLUTCH FOR A DRIVE GEAR MECHANISM FOR DRIVING COMPONENTS OF AN AIRCRAFT WING AND DRIVE GEAR MECHANISM WITH AN OVERLOAD CLUTCH

(71) Applicant: Liebherr-Aerospace Lindenberg GmbH, Lindenberg/Allgäu (DE)

(72) Inventors: Habib Stegmann, Lindenberg (DE); Boris Schweitzer, Lindenberg (DE); Anton Gaile, Leutkirch (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 795 days.

(21) Appl. No.: 16/021,150

(22) Filed: Jun. 28, 2018

(65) Prior Publication Data
US 2019/0010996 A1   Jan. 10, 2019

(30) Foreign Application Priority Data
Jul. 3, 2017  (DE) ..................... 10 2017 114 799.3

(51) Int. Cl.
*F16D 43/206* (2006.01)
*B64C 13/28* (2006.01)
*F16D 7/08* (2006.01)

(52) U.S. Cl.
CPC ............ *F16D 43/206* (2013.01); *B64C 13/28* (2013.01); *B64C 13/341* (2018.01); *F16D 7/08* (2013.01)

(58) Field of Classification Search
CPC ......... F16D 7/08; F16D 43/206; B64C 13/24; B64C 13/28; B64C 43/341; Y02T 50/40

USPC ........ 192/56.51, 56.57, 56.62, 89.29; 464/36
See application file for complete search history.

(56) References Cited

U.S. PATENT DOCUMENTS

| | | | | | |
|---|---|---|---|---|---|
| 2,728,252 | A | * | 12/1955 | Connell | ................ B25B 23/141 81/475 |
| 3,889,491 | A | * | 6/1975 | Wanner | ..................... F16D 7/06 464/36 |
| 4,053,980 | A | * | 10/1977 | Poehlman | ............... B27B 17/08 30/381 |
| 4,579,201 | A | * | 4/1986 | Tiedeman | ................. F16D 7/08 192/223.4 |
| 4,928,802 | A | * | 5/1990 | Weiss | ........................ F16F 1/32 192/56.56 |
| 2015/0111650 | A1 | * | 4/2015 | Kohuth | ............... F16D 43/2026 464/36 |

FOREIGN PATENT DOCUMENTS

| | | |
|---|---|---|
| DE | 834 481 B | 7/1949 |
| DE | 25 44 919 A1 | 4/1977 |
| DE | 27 32 241 A1 | 1/1979 |
| DE | 195 33 210 A1 | 3/1997 |
| DE | 197 10 365 A1 | 11/1997 |

* cited by examiner

*Primary Examiner* — Richard M Lorence
(74) *Attorney, Agent, or Firm* — Dilworth & Barrese, LLP

(57) ABSTRACT

The invention relates to an overload clutch for a drive gear mechanism for driving components of an aircraft wing, in particular for driving an outer slat flap of an aircraft wing, with at least one driving and at least one driven clutch body and with at least one torque transmission body arranged therebetween. The invention further relates to a drive gear mechanism with a corresponding overload clutch.

15 Claims, 5 Drawing Sheets

100

OVERLOAD CLUTCH FOR A DRIVE GEAR MECHANISM FOR DRIVING COMPONENTS OF AN AIRCRAFT WING AND DRIVE GEAR MECHANISM WITH AN OVERLOAD CLUTCH

BACKGROUND OF THE INVENTION

The invention relates to an overload clutch for a drive gear mechanism for driving components of an aircraft wing, in particular for driving an outer slat flap of an aircraft wing, with at least one driving and at least one driven clutch body, and at least one torque transmission body arranged therebetween. The invention further relates to a drive gear mechanism with a corresponding overload clutch.

The use of overload clutches in drive gear mechanisms for components of aircraft wings is known from the prior art, in which overload clutches switching balls are in constant contact with further components of the clutch at three points or in three areas. In the present case, being in constant contact means that the switching balls can be communicated with a driving and/or a driven clutch body in the engaged, as well as in the disengaged state of the overload clutch.

The balls of these types of clutches are generally known not to be able to roll, rather they slide, in a case of overload, relative to at least one of the clutch bodies, alongside the same. During the sliding of the balls, the friction coefficient changes depending on the operating state. The trigger values of the known overload clutches are hereby subject to a considerable variation. Furthermore, the centrifugal forces acting on the switching balls often have an influence on the functioning of the known clutches, whereby a difference in the operation or in the triggering behavior of the overload clutch, between static and dynamic triggering, results.

The known overload clutches thus comprise, as a disadvantage, a large variation among the trigger values of the clutches, and furthermore, a high weight, whereby the use of corresponding overload clutches is made difficult or impossible in aviation.

SUMMARY OF THE INVENTION

Against this background, it is the object of the invention to provide an improved overload clutch, which has in particular a lighter construction, and is more precisely triggerable than this is the case of the overload clutches known from the prior art.

According to the invention, this object is achieved by an overload clutch with the features herein. Advantageous configurations are also the subject-matter herein.

Accordingly, an overload clutch is provided for a drive gear mechanism for driving the components of an aircraft wing. The term components can herein also describe a single component. The drive gear mechanism can in particular be designed to drive an outer slat flap of an aircraft wing. The overload clutch includes at least one driving and at least one driven clutch body, as well as at least one torque transmission body arranged therebetween.

At least one of the clutch bodies is displaceably mounted in an axial direction, relative to the other, against the force effect of a spring assembly. It is also conceivable that both clutch bodies are displaceably coupled relative to one another and to a portion differing from the clutch bodies.

The overload clutch according to the invention allows a slim and weight-saving construction and at the same time, a high triggering accuracy of the mechanism. The triggering accuracy or the triggering behavior is further advantageously not influenced by the rotational speed of the transmitted rotational movement, neither by the temperature conditions at the clutch.

In a preferred embodiment, it is conceivable that the spring assembly is a, in particular bistable, diaphragm spring assembly. Here, the diaphragm spring assembly permits a particularly space-saving construction of the overload clutch, while an embodiment as a bi-stable diaphragm spring assembly makes the securing of the overload clutch in two desired or definable positions easier.

In a further preferred embodiment, it is conceivable that the clutch bodies can be coupled via at least one, particularly a pure ball ramp mechanism. The ball ramp mechanism can include the at least one torque-transmitting body. In particular, the ball ramp mechanism can be provided on the sides of the clutch bodies facing one another, and/or include these.

In a further preferred embodiment, it can be provided that at least one of the clutch bodies is coupled with a drive or an output, via at least one axial guide with torque transmission, or that at least one of the clutch bodies is coupled with an input or output via at least one axial ball guide. The axial guide, or the axial ball guide, enables a limited axial displacement of at least one of the clutch bodies for the purpose of the coupling and/or the decoupling of the overload clutch, while at the same time, a torque transmission between the clutch body and the drive or an output can be ensured.

In a further preferred embodiment, it is conceivable that the spring assembly includes a, in particular complete, inner and/or outer enclosure for providing a power reserve. In the case of a singular rupture of a spring or the spring assembly, the power reserve can be provided in order that the overload clutch, during normal flight operation, does not inadvertently or not yet decouple.

In a further preferred embodiment of the invention, it is conceivable that a triggering indicator is provided, which indicates the position of at least on clutch body and/or of the spring assembly. The triggering indicator can be arranged at least partially outside of a housing of the drive gear mechanism, in order to indicate the position of the clutch body and/or of the spring assembly also in a closed state of the housing or of the drive gear mechanism.

In a further preferred embodiment, it is conceivable that a catching element for carrying along the torque transmission body is provided, wherein the catching element secures the torque transmission body relative to one of the clutch bodies. The catching element can secure the torque transmission bodies in particular to exactly one of the two clutch bodies, while they are not secured to the other clutch body.

The torque transmission bodies can be arranged in a cage which can be carried along by, or is encompassed by the catching element. The torque transmission bodies can be carried along such that they at least partially remain in recesses of one of the clutch bodies in every state of the overload clutch, while the recesses of the other one of the clutch bodies are at least partially or completely left.

In a further preferred embodiment, it is conceivable that the spring assembly is rotatably mounted relative to one of the clutch bodies via a bearing provided radially inside thereon, in particular a ball bearing. Through a corresponding mounting, a reduction of the friction resistance can be effected, and thus an overload clutch running smoother can be provided, which in addition makes a higher triggering precision possible.

In a further preferred embodiment, it is conceivable that the axial guide and/or the ball guide are embodied with rolling bodies and/or sliding surfaces, which in particular comprise a slip coating and/or at least one inserted sliding body.

The invention is further aimed at a drive gear mechanism for driving components of an aircraft wing with at least one overload clutch according to the description herein.

BRIEF DESCRIPTION OF THE DRAWINGS

Further details and advantages of the invention are illustrated using the embodiments exemplarily shown in the figures. The Figures show in.

DESCRIPTION OF THE PREFERRED EMBODIMENTS

Figure 1:
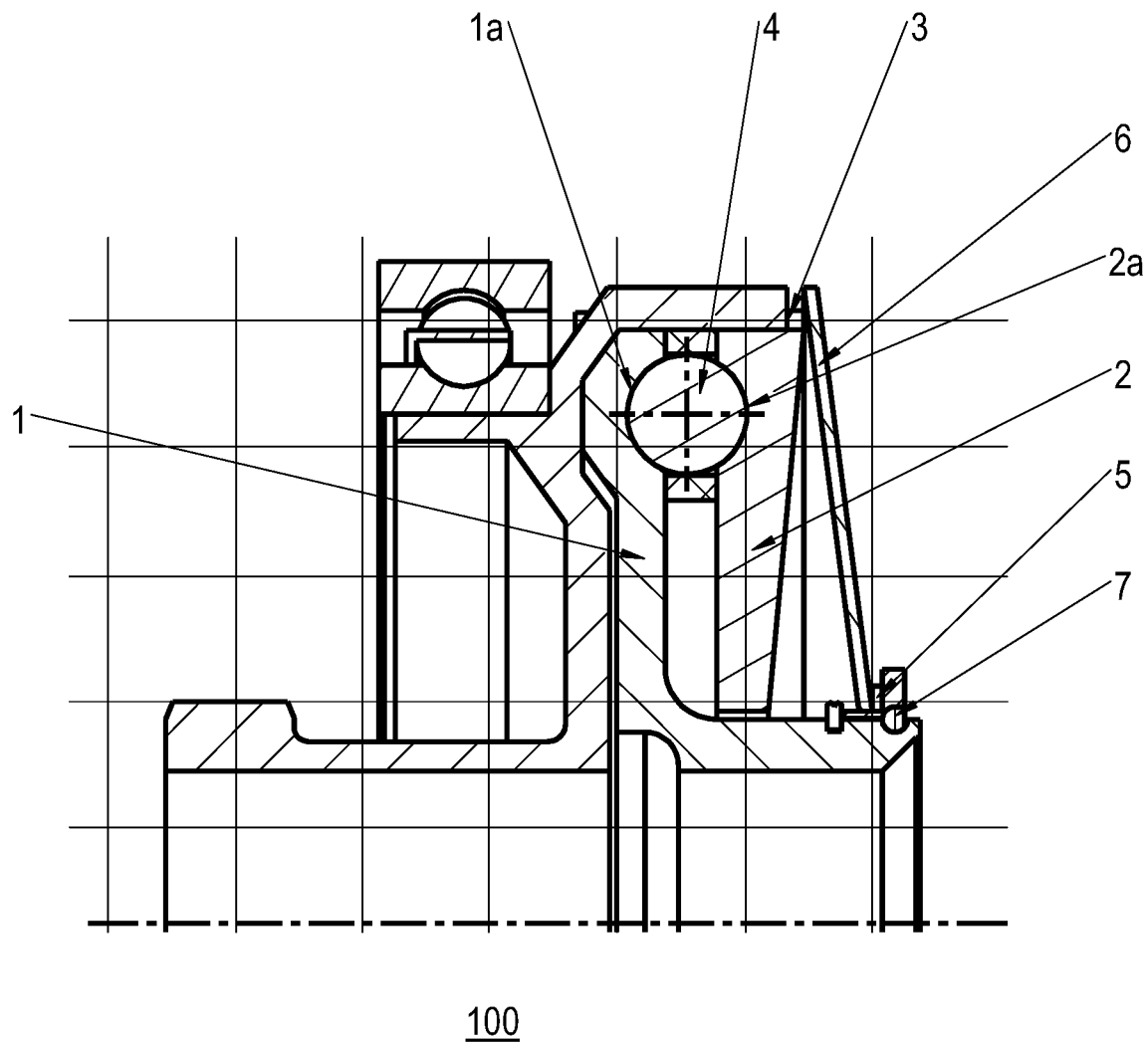
FIG. 1: a first exemplary embodiment of the overload clutch according to the invention in a sectional view.

FIG. 1 shows an overload clutch 100 according to the invention, for a drive gear mechanism for driving components of an aircraft wing. The driven components of the aircraft flap can, in particular concern an outermost slat flap or outer slat flaps of the aircraft wing.

The overload clutch 100 comprises at least one driving and at least one driven clutch body 1, 2, wherein one of the clutch bodies 1, 2, is displaceably mounted relative to the other in the axial direction. The axial direction of the overload clutch 100 is marked with the long, dashed-dotted line shown below.

The first, left clutch body 1 can move away from the second clutch body 2, against the force effect of the spring assembly 6, particularly in the axial direction, or vice versa. Here, the spring assembly 6 is stressed. When the two clutch bodies 1, 2 are spaced sufficiently far enough from one another, then the torque transmission bodies 4 arranged between the clutch bodies 1, 2 are brought out of an engagement with one of the clutch bodies 1, 2, and the clutch then finds itself in a decoupled state. The spring assembly 6 can make a part of the return force available, which is required to re-couple the overload clutch 100, from the de-coupled into the coupled state shown in FIGS. 1 and 2. It is also conceivable that the return force can at least partially be provided by a corresponding return mechanism.

The overload clutch 100 according to the invention constitutes a low-friction and clearance-free clutch. Both clutch bodies 1, 2 can comprise recesses 1a, 2a formed in the axial direction, in which recesses in particular cage-guided torque transmission bodies 4 can be arranged in the coupled state of the clutch.

A torque-transmitting axial guide 3 can transmit a rotational movement to the clutch body 2, while the axial guide 3 simultaneously makes it possible for the clutch body 2 to move in the axial direction relative to the clutch body 1. In addition, the axial guide 3 from FIG. 1 can, for example, include recesses running in the axial direction, in which recesses corresponding formations of the second clutch body 2 are mounted to be axially displaceable.

A spring assembly 6 can be provided, in particular axially outside on the overload clutch 100, which holds both of the clutch bodies 1, 2 together, or which, via a spring force exerted by it, counteracts the clutch bodies 1, 2 axially moving apart. A limit torque of the clutch can hereby be set, at which the clutch switches from a coupled into and decoupled state.

An adjusting screw/nut and/or shim 5 provided axially further outside from spring assembly 6 can be provided for adjusting the spring assembly 6 or for adjusting the spring hardness or spring stiffness of the spring assembly 6. The axially outer side of the overload clutch 100 is presently to be understood as the side located outside of both of the clutch bodies 1, 2, or farther from both of the clutch bodies 1, 2.

In order to let the clutch spin freely after exceeding of a specified limit torque, a bi-stable spring assembly 6 is preferred, which keeps out or releases a clutch body 1 out of engagement with the torque transmission bodies 4 upon reaching the set switching point.

Figure 2:
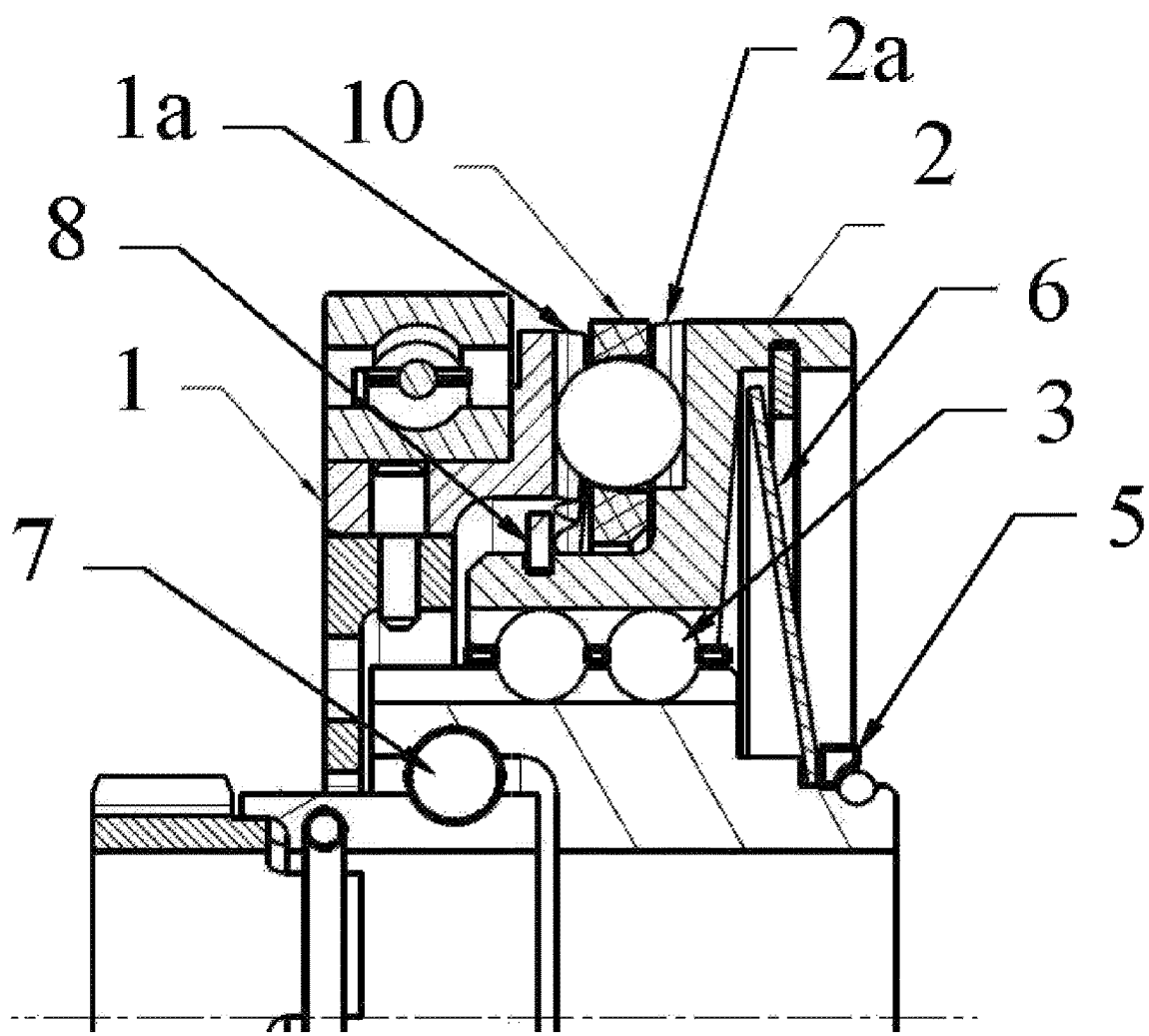
FIG. 2: a second exemplary embodiment of the overload clutch according to the invention in a sectional view.

A catching element 8 shown in FIG. 2 on the second clutch body 2 carries along a cage 10 with the torque transmission bodies 4 coupled thereto, so that the torque transmission bodies 4 do not completely leave the recesses 2a of the clutch body 2 in the coupled, as well as in the decoupled state of the clutch.

Merely the recesses 1a of the first clutch body 1 are, in the coupled state of the clutch, left by the torque transmission body 4. The described arrangement can also be executed in reverse, wherein the torque transmission body or bodies 4 are, by means of the catching element 8, permanently secured relative to the first 1, instead of to the second clutch body 2.

For the purpose of an additional friction reduction, the axial guide 3 can be embodied with rolling bodies and/or sliding surfaces, which can optionally comprise a slip coating and/or inserted sliding bodies. An additional radial mounting 7 of the spring assembly 6 and/or of the shim 5 relative to at least one of the clutch bodies 1, 2 can likewise act in a friction-reducing manner.

The exemplary embodiment of FIG. 2 differs from the exemplary embodiment of FIG. 1, among other things, in that the axial guide 3 is arranged radially inside, while the axial guide 3 of the exemplary embodiment of FIG. 1 is provided radially outside, i.e. further up in the Figure. The axial guide 3 of the exemplary embodiment of FIG. 2 can be formed as a ball guide 3, via which the second clutch body 2 can be coupled with a drive or output for torque transmission. The axial guide 3 can include groups of two or more guiding bodies, in particular balls, arranged next to one another in the axial direction.

As can be taken from FIGS. 1 and 2, the spring assembly 6 can be or include a diaphragm spring assembly, which, in an unstressed state, is positioned axially further away from the overload clutch 100 at its radially inner region than with its radially outer region. Furthermore, it can be provided that the spring assembly 6 or the corresponding diaphragm spring assembly extends equidistantly in the radial direction to the clutch bodies 1, 2, or extends in the radial direction at least 80 or 90% as far as the clutch bodies 1, 2.

Figure 3:
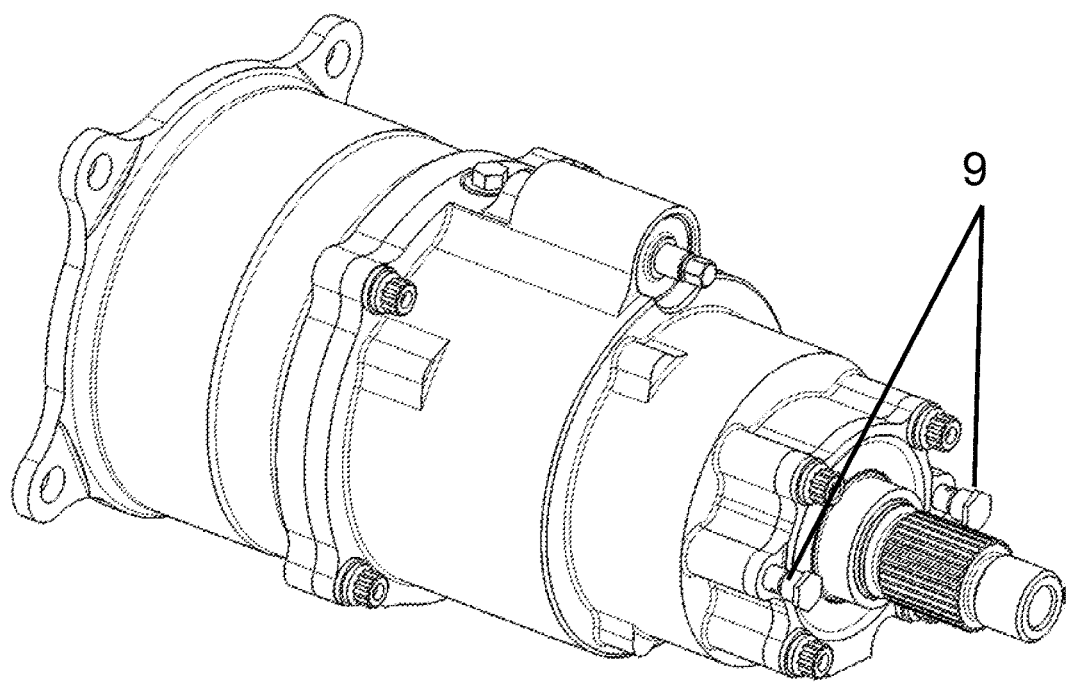
FIG. 3: a perspective view of a drive gear mechanism with an overload clutch.

FIG. 3 shows a perspective plan view of the drive gear mechanism, wherein two reset buttons 9 can be provided on an axially outer surface of the drive gear mechanism for manually resetting the overload clutch 100. By means of the reset buttons 9, parts of the overload clutch 100, such as for example the spring assembly 6 can be acted on from outside of the drive gear mechanism, and the overload clutch 100 can thus be put, into a coupled state, in particular.

Figure 4A:
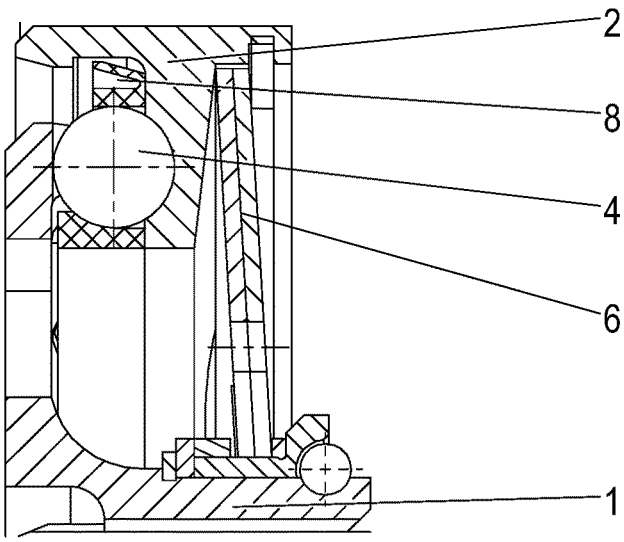
FIGS. 4a-c: an overload clutch in different switching states.
Figure 4B:
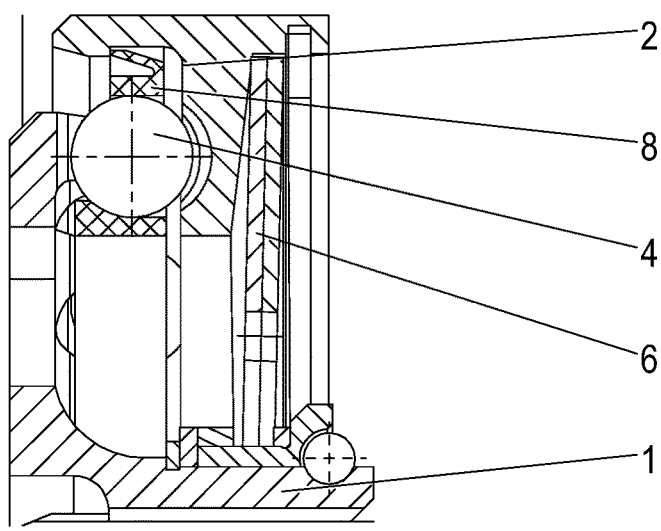
Figure 4C:
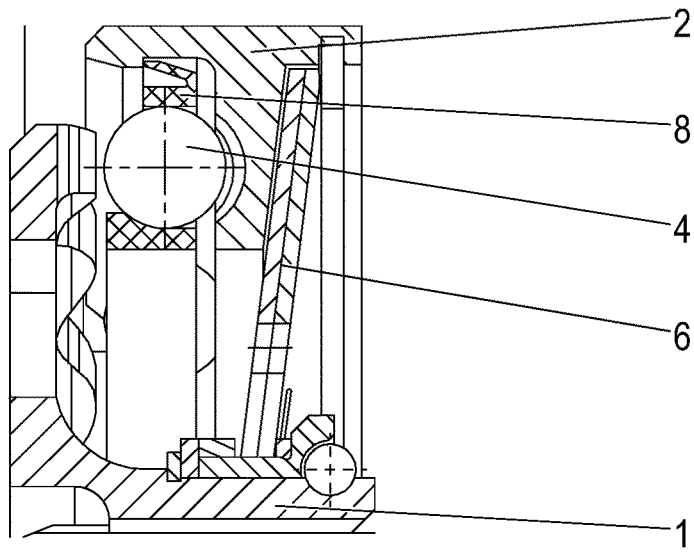
Figure 5:
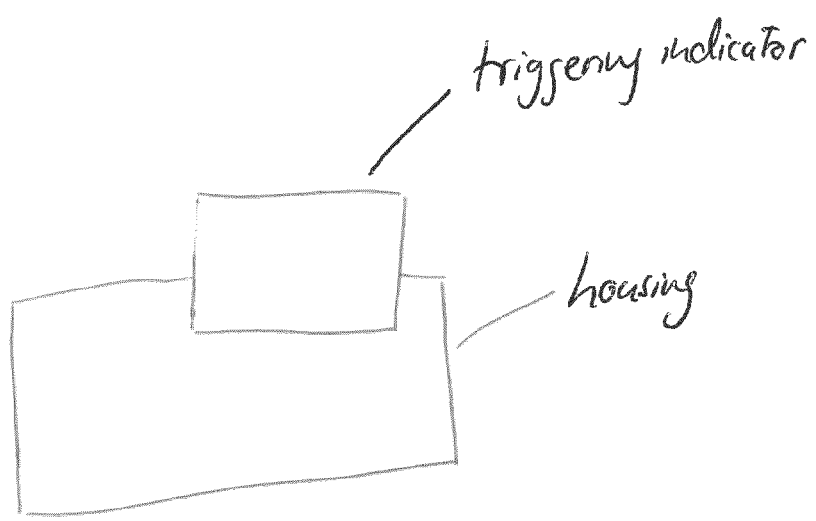
FIG. 5 triggering mechanism.

FIGS. 4a-c show the overload clutch 100 in different switching states. FIG. 4a shows the overload clutch 100 in a coupled state, in which the torque transmission body is arranged within the recesses 1a, 2a of both clutch bodies 1, 2 shown in the FIGS. 1 and 2. The spring assembly 6 can, in this state, be substantially planarly aligned.

FIG. 4b shows a state, in which both of the clutch bodies 1, 2 have moved away from each other to some extend in the axial direction. The torque transmission body 4 is only still partially in contact with at least one of the clutch bodies 1, 2. In this state, the bi-stable spring assembly 6 snaps over so that the state illustrated in FIG. 4c is achieved.

FIG. 4c shows a state, in which the overload clutch 100 is uncoupled or decoupled. The torque transmission body 4 has completely left the first clutch body 1 and is, by means of a cage or catching element 8, held at least partially within the recesses 2a of the second clutch body 2. The spring assembly 6 is stressed, no longer planar, and can, in portions, have the form of a shell of a truncated cone.

According to the invention, a ball ramp mechanism can, in overloading the overload clutch 100, act against the spring assembly 6 or a diaphragm spring pack. The diaphragm springs or the spring assembly 6 can, by means of at least one shim, be constantly prestressed. In an overload situation, the spring diaphragm or spring diaphragms can be stressed so far that they snap over by themselves. Via the catching element 8, a cage and a torque transmission body 4 or balls can be carried along such that the balls remain in the ball sockets of one of the clutch bodies in a defined manner.

The overload clutch can be used for aerospace applications, wherein a pure ball ramp mechanism can be provided. A bistable diaphragm spring assembly with a degressive characteristic curve and long working stroke can be provided.

An axial guide with torque transmission, such as e.g. a jaw guide can further be provided, in which the sliding surfaces are optionally equipped with a slip coating and/or inserted sliding bodies. Alternatively or additionally, an axial ball guide can be provided.

A complete inner and/or outer enclosure of the spring configuration can be provided. In the event of a singular rupture of a spring, a power reserve can hereby still be provided.

A triggering indicator can further be provided, which operates mechanically or by means of sensors, and in which the movement of at least one of the clutch bodies 1, 2 and/or of the bistable spring assembly 6 can be tapped.

Overload clutch for aviation, optionally with use of a plurality of the necessary recesses in the clutch body (1), in order to make the resetting of the clutch easier.

One of the clutch bodies can further be embodied with a catching element 8, which in the event of a triggering, carries along the cage with torque transmission bodies in such a way that the torque transmission bodies 4 remain in the recesses 1a, 2a, of the respective clutch bodies 1, 2.

The invention claimed is:

1. Overload clutch for a drive gear mechanism for driving components of an aircraft wing, in particular for driving an outer slat flap of an aircraft wing, comprising a driving clutch body, a driven clutch body, a torque transmission body arranged therebetween, and a spring assembly, wherein
at least one of the clutch bodies is displaceably mounted in an axial direction, relative to the other, against the force effect of the spring assembly, and,
additionally comprising a torque-transmitting axial guide arranged to transmit rotational movement to the driven clutch body and enable axial displacement of the driven clutch body, and including axially-extending recesses arranged to receive corresponding formations of the driven clutch body to be axially displaceable,
wherein the axial guide is arranged radially outside the driving and driven clutch bodies.

2. Overload clutch according to claim 1, wherein the spring assembly is a particularly bi-stable diaphragm spring assembly, and mounted on the driving and driven clutch bodies to axially tilt toward the clutch bodies at an acute angle in coupled, unstressed state and tilt away from the clutch bodies at an obtuse angle in decoupled, stressed state.

3. Overload clutch according to claim 1, wherein the clutch bodies can be coupled via at least one ball ramp mechanism.

4. Overload clutch according to claim 1, wherein the spring assembly includes a particularly complete inner and/or outer enclosure for providing a power reserve.

5. Overload clutch according to claim 1, wherein a triggering indicator is provided, which indicates the position of at least one clutch body and/or of the spring assembly.

6. Overload clutch according to claim 1, wherein the spring assembly is mounted rotatably relative to one of the clutch bodies via a bearing provided radially inside thereto, in particular a ball bearing.

7. Overload clutch according to claim 1, wherein the axial guide is embodied with rolling bodies and/or sliding surfaces.

8. Overload clutch according to claim 7, wherein the rolling bodies and/or sliding surfaces comprise a slip coating and/or at least one inserted sliding body.

9. Drive gear mechanism for driving components of an aircraft wing, with at least one overload clutch according to claim 1.

10. Overload clutch according to claim 1, additionally comprising
an additional radial mounting for the spring assembly and an adjusting screw/nut and/or shim situated on the mounting axially outside of the spring assembly from the clutch bodies, for adjusting tension of the spring assembly.

11. Overload clutch for a drive gear mechanism for driving components of an aircraft wing, in particular for driving an outer slat flap of an aircraft wing, comprising a driving clutch body, a driven clutch body, a torque transmission body arranged therebetween, and a spring assembly, wherein
at least one of the clutch bodies is displaceably mounted in an axial direction, relative to the other, against force effect of the spring assembly, and,
additionally comprising a torque-transmitting axial guide arranged to transmit rotational movement to the driven clutch body and enable axial displacement of the driven clutch body, and including axially-extending recesses arranged radially inside the driving and driven clutch bodies,
balls axially arranged with respect to one another in the recesses of the axial guide, and
a catching element having a cage encompassing the torque transmission body, to ensure the torque transmission body at least partially remains in a recess formed in the driven clutch body in both coupled and decoupled states,
wherein said cage and recess in the driven clutch body are situated radially outwardly from said axially-extending recesses.

12. Overload clutch according to claim 11, wherein a catching element is provided for carrying along the torque transmission bodies, and the catching element secures the torque transmission bodies relative to one of the clutch bodies.

13. Overload clutch according to claim 11, wherein the spring assembly is a bi-stable diaphragm spring assembly, and mounted on the driving and driven clutch bodies to axially tilt toward the clutch bodies at an acute angle in coupled, unstressed state and tilt away from the clutch bodies at an obtuse angle in decoupled, stressed state.

14. Overload clutch according to claim 11, wherein the rolling bodies comprise a slip coating and/or at least one inserted sliding body.

15. Drive gear mechanism for driving components of an aircraft wing, with at least one overload clutch according to claim 11.

\* \* \* \* \*